June 19, 1923.

G. K. THOMPSON

MEANS FOR EQUALIZING TRANSMISSION OVER LINES OF DIFFERENT ELECTRICAL CHARACTERISTICS

Filed Oct. 29, 1918

INVENTOR.
G. K. Thompson
BY G. E. Folk,
ATTORNEY

June 19, 1923.

G. K. THOMPSON

MEANS FOR EQUALIZING TRANSMISSION OVER LINES OF DIFFERENT ELECTRICAL CHARACTERISTICS

Filed Oct. 29, 1918

INVENTOR.

G. K. Thompson

BY

ATTORNEY

June 19, 1923.  
G. K. THOMPSON  
MEANS FOR EQUALIZING TRANSMISSION OVER LINES OF DIFFERENT ELECTRICAL CHARACTERISTICS  
Filed Oct. 29, 1918
1,459,003
3 Sheets-Sheet 3
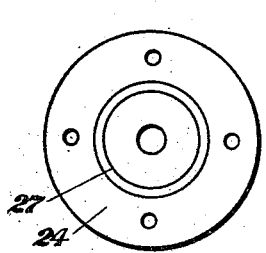
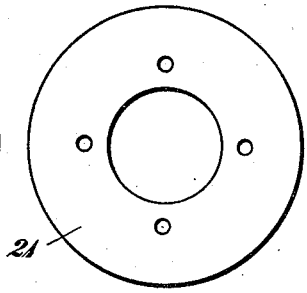
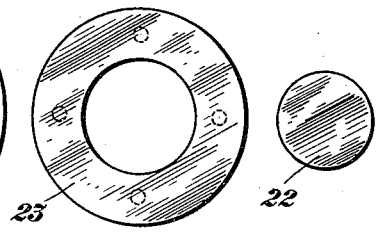
Fig. 9   Fig. 10   Fig. 11   Fig. 12
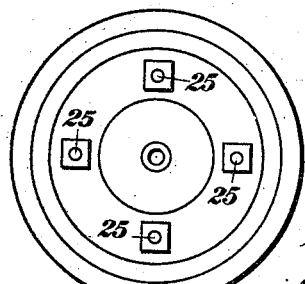
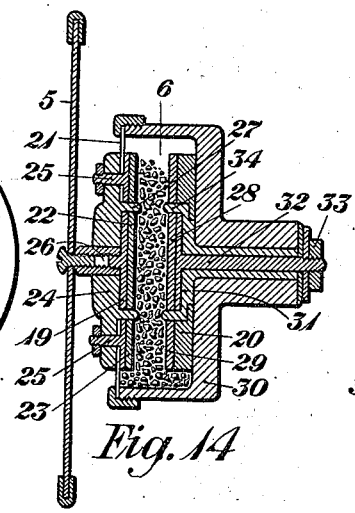
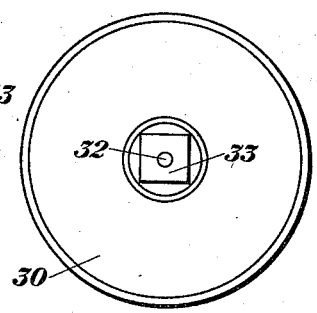
Fig. 13   Fig. 14   Fig. 15
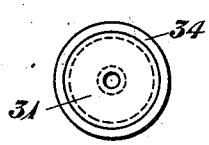
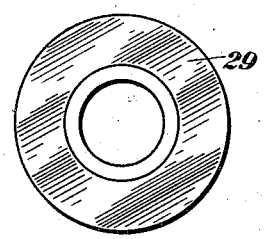
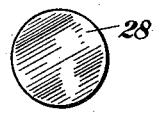
Fig. 16   Fig. 17   Fig. 18
INVENTOR.  
G. K. Thompson  
BY  
ATTORNEY Patented June 19, 1923.

1,459,003

UNITED STATES PATENT OFFICE.

GEORGE K. THOMPSON, OF MAPLEWOOD, NEW JERSEY, ASSIGNOR TO AMERICAN TELEPHONE AND TELEGRAPH COMPANY, A CORPORATION OF NEW YORK.

MEANS FOR EQUALIZING TRANSMISSION OVER LINES OF DIFFERENT ELECTRICAL CHARACTERISTICS.

Application filed October 29, 1918. Serial No. 260,147.

*To all whom it may concern:*

Be it known that I, GEORGE K. THOMPSON, residing at Maplewood, in the county of Essex and State of New Jersey, have invented certain Improvements in Means for Equalizing Transmission Over Lines of Different Electrical Characteristics, of which the following is a specification.

This invention relates to telephone systems and more particularly to the provision of means whereby the transmission over telephone lines of different electrical characteristics may be equalized or rendered more uniform.

Telephone lines have, in general, different electrical characteristics varying with the length of the lines. For any particular type of line construction which may be employed the resistance, capacity, inductance and leakage of the circuit increase with the length. These variations in the electrical characteristics of the different subscribers' lines in a telephone system introduce a number of variable effects in the telephone service rendered from different stations. For example, the different electrical characteristics result in different degrees of attenuation in the alternating telephone current passing over the subscribers' lines and thus give louder and more effective telephonic communication to subscribers connected by means of short lines than to subscribers connected by means of long lines. As a result, a subscriber having a long line, when connected with any other subscriber, does not receive as good telephone transmission as would a subscriber having a short line similarly connected. Furthermore, in the common battery systems now so generally employed in all but small communities, the resistance of the line causes a further effect on the transmission in that it reduces the amount of direct current which the transmitter receives from the central office battery and so renders it less efficient in the generation of the alternating telephone current.

In view of the conditions above referred to, it has not been heretofore possible to provide all subscribers with the same grade of transmission and it is one of the objects of this invention to provide means whereby this difficulty may be overcome, although other and further objects of the invention will appear from the description hereinafter given.

The objects of this invention may be secured by associating with each line a telephone transmitter whose resistance is adjusted in accordance with the electrical characteristics of the line. Where the transmission line is of high impedance, since the direct current supplied to the transmitter over the line is small, the transmitter should be of high resistance so that for a given variation of the transmitter resistance a proportionately larger variation of the total resistance including that of the line will be produced, and consequently a greater transmission efficiency will result. Where the line is of low impedance and the current supplied large, the transmitter resistance should be comparatively small so that a given variation in the transmitter resistance produces a relatively small variation in the total resistance. Consequently the transmission efficiency under this condition may be made little if any greater than under the first condition above mentioned.

These results may be secured in accordance with the present invention by providing a transmitter having a plurality of variable resistance paths so arranged that they may be connected in a plurality of different relations to produce a transmitter having different effective resistances depending upon the character of the line with which it is to be associated. Since in practice it is not expedient to provide a sufficient number of paths for the transmitter to give a sufficiently large number of effective resistances to correctly adapt the transmitter to lines of any impedance, the invention contemplates grouping the lines according to their impedance and providing each line in the group with a transmitter whose resistance is adjusted in accordance with the average impedance of the lines of the group. Preferably the multiple paths through the transmitter may be secured by providing the transmitter with a granular carbon resistance button, the electrodes of which are divided into a plurality of sections adapted to be variably interconnected.

The invention may now be fully understood from the following description when read in connection with the accompanying drawing in which.

Figure 5:
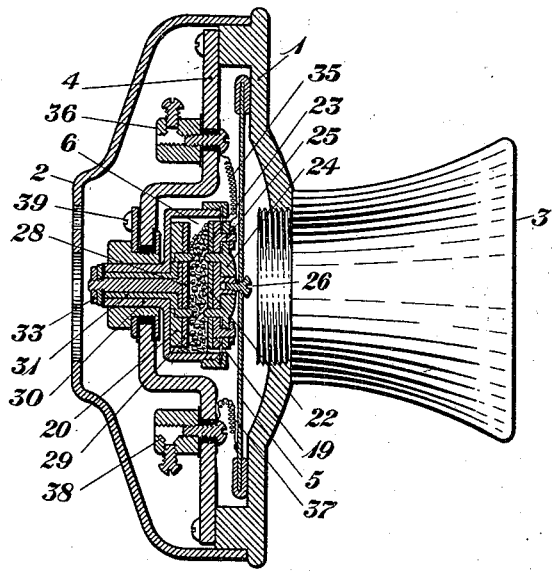
Figure 5 is a sectional view of a modified form of transmitter.

Figures 9 to 18 inclusive are views illustrating various details of the transmitter of Figure 5.

Figures 1, 2:
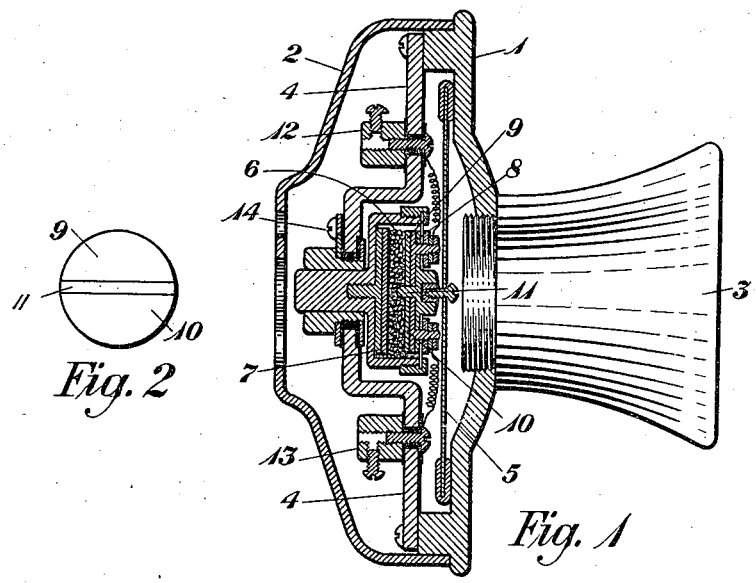
Figure 1 is a sectional view of a transmitter embodying the principles of the invention.
Figure 2 is a face view of the front electrode of the transmitter of Figure 1.

Referring to Figure 1 a telephone transmitter is shown comprising the usual front casing 1, back casing or shell 2, mouthpiece 3, supporting bridge 4 and diaphragm 5. Suitably mounted upon the supporting bridge 4 and electrically insulated therefrom is a granular carbon resistance button 6 comprising a back electrode 7 and a front electrode 8, between which is placed a suitable amount of granulated carbon, said front electrode 8 being carried by and movable with the diaphragm 5. The front electrode 8 as shown in Fig. 2 comprises two sections 9 and 10 separated by an insulating member 11. The sections 9 and 10 are electrically connected to binding posts 12 and 13 mounted upon the supporting bridge 4 and insulated therefrom. The back electrode 7 is electrically connected through the body of the resistance button 6 to a binding screw 14 which is also insulated from the supporting bridge 4. It will be seen that by means of this arrangement two variable resistance paths extend through the button 6, one from section 9 to back electrode 7 and the other from section 10 to back electrode 7. A third path extends between sections 9 and 10 which is of relatively high resistance. This path is through the granular carbon alone.

Figure 3:
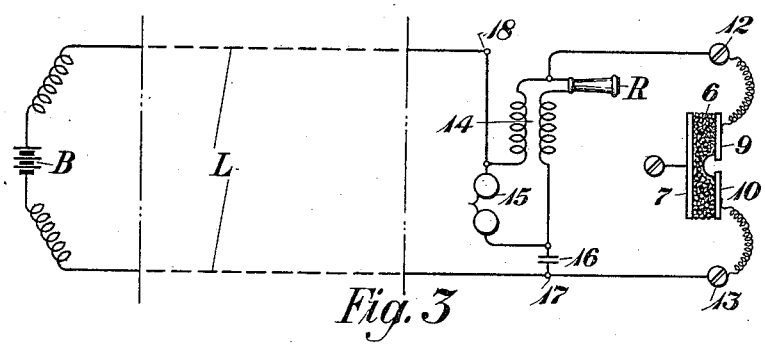
Figures 3 and 4 are circuit diagrams of the transmitter of Figure 1 as applied to lines of high and low impedance respectively.
Figure 4:
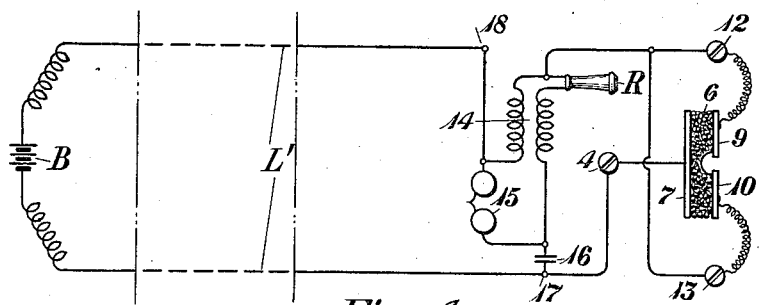

Referring now to Figure 3 which shows the circuit connections of the transmitter of Figure 1 as applied to a line of high impedance, the line L is connected at the central station to a common source of battery supply current B while at the subscriber's station it terminates in the usual subscriber's set including receiver R, transmitter 6, induction coil 14, ringer 15 and condenser 16. From the terminal 17 of the line a connection extends to binding post 13, section 10 of the front electrode, through the granular carbon to back electrode 7, thence through the granular carbon to section 9 of the front electrode, thence to binding post 12 and through one winding of the induction coil 14 to the terminal 18 of the line. It will be noted that the circuit above traced includes two paths through the resistance button 6 in series, so that the resistance of the transmitter is relatively high, thereby producing a high power transmitter suitable for use in connection with lines of high impedance such as the line L. The direct path between sections 9 and 10 is neglected since it is of relatively high resistance compared with the above paths.

Where the transmitter is to be used in connection with a line of low impedance such as the line L' of Figure 4, the binding posts 12 and 13 are strapped together and a circuit extends from terminal 17 of the line to the binding screw 4, and the back electrode 7 of the resistance button 6 and thence in parallel through the granular carbon resistance to the sections 9 and 10 of the front electrode, from which point the circuit continues in parallel to the binding posts 12 and 13, where the two paths merge and the circuit continues through one winding of the induction coil 14 to the terminal 18 of the line.

It will be seen that in this case the two paths through the resistance button 6 are connected in parallel, thereby materially reducing the effective resistance of the transmitter so that when associated with a low impedance line such as the line L' its efficiency will be lower and the resultant transmission will be comparable to that secured when the transmitter is connected as shown in Figure 3 to a line of high impedance.

In Figure 5 a modified form of transmitter is illustrated, the resistance button 6 in this case including a front electrode 19 and back electrode 20, each electrode comprising two sections of different area, the structure being shown more clearly in Figures 9 to 18. As shown in Figure 14 the front electrode is mounted upon the mica diaphragm 21 and comprises an inner circular section 22 of small area and an outer annular section 23 of large area. The outer annular section is secured to the front electrode support 24 of insulating material by means of studs 25, the mica diaphragm 21 being clamped between the support 24 and the annular section 23. The small section 22 is secured to the front electrode support 24 and the latter is secured to the diaphragm 5 by means of the screw connection 26. The front electrode support 24 is provided with an annular projection 27 extending between the inner and outer sections of the front electrode in order to insulate the sections from each other. The back electrode 20 is likewise composed of two sections, one being an inner circular section 28 and the other an outer annular section 29. The outer annular section is mounted upon the body 30 of the resistance button 6, while the inner section 28 is mounted on the back electrode insulator 31 and is provided with a stud 32 and a nut 33 insulated from the body 30 for completing electrical connections to the inner section. The back electrode insulator 31 is seated in an opening through the body 30 and is provided with an annular projection 34 for the purpose of insulating the outer and inner sections of the back electrode. It will be seen that by means of this construction the inner and outer sections of each of the electrodes are electrically insulated from each other.

Returning now to Figure 5 the outer section 23 of the front electrode is connected by means of a conductor 35 attached to one of the studs 25 with a binding post 36 mounted upon the supporting bridge 4 and insulated therefrom. The inner section 22 of the front electrode is electrically connected to the diaphragm 5 by means of the screw connection 26 already referred to. The diaphragm 5 is connected by means of conductor 37 with the binding post 38 mounted upon the supporting bridge 4 in a manner similar to that described in connection with the binding post 36. The outer section of the back electrode is an electrical connection with the body 30 of the resistance button 6 which is connected to a binding screw 39 insulated from the supporting bridge 4, the body of the resistance button 6 being likewise insulated from the supporting bridge 4 upon which it is mounted. The inner section 28 is insulated from the body 30 as already stated by the back electrode insulator 31 and connections may be made to the inner section 28 by means of the nut 33.

Figure 6:
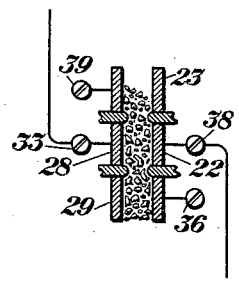
Figures 6, 7 and 8 are schematic diagrams showing several ways of interconnecting the sections of the electrodes of the transmitter in Figure 5.
Figure 7:
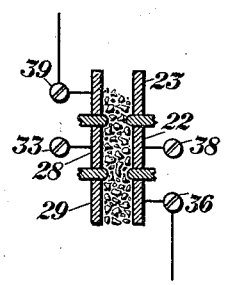
Figure 8:
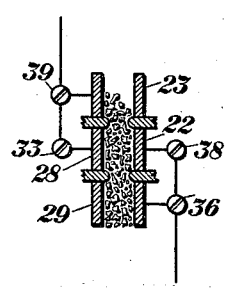

The sections of the two electrodes with their several terminals as above described furnish a convenient means whereby the transmitter may be connected in a number of different ways in order that it may have different effective resistances. Where the transmitter is to be associated with a line of high impedance, one line terminal may be connected to the binding post 33 as shown in Figure 6, and the other line terminal to the binding post 38, so that the connection through the resistance cups only includes the inner sections 22 and 28 of the front and back electrode which are of relatively small area, so that the transmitter will now be a high resistance transmitter. Where the transmitter is to be associated with a line of medium impedance the connections shown in Figure 7 may be employed. In this figure one terminal of the line is connected to the binding screw 39 and the other terminal to the binding post 36, so that the resistance path through the transmitter includes only the outer sections 23 and 29 of the front and back electrode respectively, which sections are of larger area than the inner sections, so that a path of somewhat lower resistance is provided. Where the transmitter is to be associated with a line of low impedance the binding screw 39 will be strapped to the binding post 33 and the binding posts 36 and 38 will also be strapped together as shown in Figure 8. One line terminal may then be connected to the binding screw 39 and the other line terminal to the binding post 36, so that the two sections of each electrode are connected in parallel and two parallel resistance paths are completed with the resistance buttons. By means of this connection a transmitter of low resistance is provided. The transmission lines may be grouped in accordance with their impedances into three groups and the three different forms of connections may be employed for the transmitters associated with the three groups.

It will be seen that by means of the arrangements above described a simple though efficient means has been provided whereby the telephonic transmission over lines of different character may be equalized and rendered more uniform, so that subscribers having instruments on loops of different length will receive substantially the same transmission. It will also be obvious that the general principles herein disclosed may be embodied in many other organizations widely different from those illustrated without departing from the spirit of the invention as defined in the appended claims:

What is claimed is:

1. A telephone transmitter for use in connection with lines of different electrical characteristics, said transmitter including a single variable resistance button comprising a casing having a unitary mass of granular material therein and also having opposed electrodes movable with respect to each other, one of said electrodes comprising a plurality of sections, and a plurality of terminals for interconnecting said electrodes differently to form a plurality of paths through said granular material in accordance with the electrical characteristics of the line with which the transmitter is to be used.

2. A telephone transmitter for use in connection with lines of different electrical characteristics, said transmitter including a single variable resistance button comprising a casing having a unitary mass of granular material therein and also having opposed electrodes movable with respect to each other, each of said electrodes comprising a plurality of sections, and a plurality of terminals for interconnecting said sections differently to form a plurality of paths through said granular material in accordance with the electrical characteristics of the line with which the transmitter is to be used.

3. A telephone transmitter for use in connection with lines of different electrical characteristics, said transmitter including a single variable resistance button comprising a casing having a unitary mass of granular material therein and also having opposed electrodes movable with respect to each other, each of said electrodes including a plurality of sections of different area, and a plurality of terminals for interconnecting said sections differently to form a plurality of paths through said granular material in accordance with the electrical characteristics of the line with which the transmitter is to be used.

4. A telephone transmitter for use in connection with lines of different electrical characteristics, said transmitter including a single variable resistance button comprising a casing having a unitary mass of granular material therein and also having opposed electrodes movable with respect to each other, each electrode comprising a plurality of sections of different area and a plurality of terminals for completing a variable resistance path through the granular material of said button lying between sections of small area of the two electrodes, or lying between sections of large area of the two electrodes, or lying between a plurality of sections of the two electrodes connected in multiple according to the electrical characteristics of the line with which the transmitter is to be used.

5. A telephone transmitter for use in connection with lines of different electrical characteristics, said transmitter including a single resistance button comprising a casing having a unitary mass of granular material therein and also having a plurality of electrodes separated by granular material, and means for varying the effective conducting area of the electrodes to render a variable amount of said granular material effective to form a path through said button and to thereby adjust the resistance of the transmitter in accordance with the electrical characteristics of the line with which the transmitter is to be used.

In testimony whereof I have signed my name to this specification this 19th day of Oct., 1918.

GEORGE K. THOMPSON.